(12) United States Patent
Kawaguchi

(10) Patent No.: US 10,838,671 B2
(45) Date of Patent: Nov. 17, 2020

(54) TERMINAL DEVICE, NON-TRANSITORY COMPUTER-READABLE RECORDING MEDIUM STORING INSTRUCTIONS TO CONTROL THE TERMINAL DEVICE AND METHOD OF CONTROLLING TERMINAL DEVICE

(71) Applicant: Brother Kogyo Kabushiki Kaisha, Nagoya (JP)

(72) Inventor: Masafumi Kawaguchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/228,949

(22) Filed: Dec. 21, 2018

(65) Prior Publication Data

US 2019/0196758 A1 Jun. 27, 2019

(30) Foreign Application Priority Data

Dec. 26, 2017 (JP) ................................. 2017-249430

(51) Int. Cl.
*G06F 3/12* (2006.01)
*H04N 1/00* (2006.01)
*H04N 1/327* (2006.01)

(52) U.S. Cl.
CPC ............ *G06F 3/1226* (2013.01); *G06F 3/121* (2013.01); *G06F 3/1205* (2013.01); *G06F 3/1261* (2013.01); *G06F 3/1292* (2013.01); *H04N 1/00307* (2013.01); *H04N 1/00474* (2013.01); *H04N 1/00973* (2013.01); *H04N 1/32776* (2013.01); *H04N 2201/006* (2013.01); *H04N 2201/0075* (2013.01); *H04N 2201/0094* (2013.01)

(58) Field of Classification Search
CPC ............................ G06F 3/1226; G06F 3/1225
See application file for complete search history.

(56) References Cited

U.S. PATENT DOCUMENTS

| | | | | |
|---|---|---|---|---|
| 6,348,971 | B2 * | 2/2002 | Owa ...................... | G06F 3/1204 358/1.1 |
| 9,223,529 | B1 * | 12/2015 | Khafizova ............. | G06F 3/1204 |
| 9,335,957 | B2 | 5/2016 | Okamura | |
| 9,665,317 | B2 | 5/2017 | Yokoyama | |

(Continued)

FOREIGN PATENT DOCUMENTS

| | | |
|---|---|---|
| JP | 2011-008564 A | 1/2011 |
| JP | 2014-177069 A | 9/2014 |

(Continued)

*Primary Examiner* — Ted W Barnes
(74) *Attorney, Agent, or Firm* — Banner & Witcoff, Ltd.

(57) ABSTRACT

A terminal device includes an operation interface, a short-range wireless communication interface, and a processor. The terminal device receives a designating operation of designating a model of an image processing device and a setting operation of setting an execution condition to perform an imaging process. After establishing a short-range wireless communication with the image processing device, the terminal device determines whether a model of the image processing device coincides with a designated model. When the two models coincide with each other, an execution instruction is transmitted to the image processing device.

13 Claims, 7 Drawing Sheets

(56) References Cited

U.S. PATENT DOCUMENTS

| | | | | |
|---|---|---|---|---|
| 2002/0062397 A1* | 5/2002 | Chang | ............... | H04L 67/2828 709/246 |
| 2002/0156947 A1* | 10/2002 | Nishio | ............... | G06F 9/4411 710/36 |
| 2003/0011805 A1* | 1/2003 | Yacoub | ............... | G06F 3/1207 358/1.15 |
| 2004/0036908 A1* | 2/2004 | Yagita | ............... | G06F 3/1261 358/1.15 |
| 2004/0070779 A1* | 4/2004 | Ferlitsch | ............... | G06F 3/1288 358/1.13 |
| 2004/0137855 A1* | 7/2004 | Wiley | ............... | G06F 3/1204 455/88 |
| 2004/0190042 A1* | 9/2004 | Ferlitsch | ............... | G06F 3/1285 358/1.15 |
| 2005/0066072 A1* | 3/2005 | Nakamura | ............... | G06F 3/1204 710/8 |
| 2005/0088681 A1* | 4/2005 | Hosoda | ............... | G06F 3/1204 358/1.14 |
| 2005/0102442 A1* | 5/2005 | Ferlitsch | ............... | G06F 3/1239 710/15 |
| 2006/0279776 A1* | 12/2006 | Akiyama | ............... | G06F 3/1288 358/1.15 |
| 2007/0095906 A1* | 5/2007 | Camilleri | ............... | G06Q 10/087 235/385 |
| 2007/0229891 A1* | 10/2007 | Yanagi | ............... | H04L 67/18 358/1.15 |
| 2007/0234354 A1* | 10/2007 | Hattori | ............... | G06F 3/1287 717/177 |
| 2008/0013109 A1* | 1/2008 | Chen | ............... | G06F 3/1209 358/1.1 |
| 2008/0225326 A1* | 9/2008 | Kephart | ............... | G06Q 30/0261 358/1.15 |
| 2009/0164940 A1* | 6/2009 | Wampler | ............... | G06Q 30/02 715/808 |
| 2009/0201547 A1* | 8/2009 | Noguchi | ............... | G06F 3/1228 358/1.15 |
| 2009/0296140 A1* | 12/2009 | Sugiyama | ............... | G06F 3/1204 358/1.15 |
| 2010/0053659 A1* | 3/2010 | Hattori | ............... | H04N 1/00233 358/1.13 |
| 2010/0245885 A1* | 9/2010 | Selvaraj | ............... | G06F 3/1288 358/1.15 |
| 2010/0315680 A1* | 12/2010 | Ishikake | ............... | G06F 3/1229 358/1.15 |
| 2010/0321716 A1* | 12/2010 | Takeo | ............... | G06F 3/1222 358/1.14 |
| 2011/0188064 A1* | 8/2011 | Awata | ............... | G06F 3/12 358/1.13 |
| 2011/0235090 A1* | 9/2011 | Salgado | ............... | G06F 3/1261 358/1.15 |
| 2012/0044534 A1* | 2/2012 | Ichikawa | ............... | G06F 3/1225 358/1.15 |
| 2013/0268928 A1* | 10/2013 | Harada | ............... | G06F 9/4411 717/177 |
| 2014/0139876 A1* | 5/2014 | Kadota | ............... | G06F 3/1209 358/1.15 |
| 2014/0185097 A1* | 7/2014 | Shiraga | ............... | G06F 3/1292 358/1.15 |
| 2014/0211257 A1* | 7/2014 | Ishii | ............... | G06F 3/1292 358/1.15 |
| 2014/0268209 A1 | 9/2014 | Yokoyama | | |
| 2014/0340701 A1* | 11/2014 | Okamura | ............... | H04N 1/0097 358/1.14 |
| 2015/0193674 A1* | 7/2015 | Ishiguro | ............... | G06F 3/1253 358/1.15 |
| 2016/0274835 A1* | 9/2016 | Mihira | ............... | G06F 3/1204 |
| 2017/0160995 A1* | 6/2017 | Fukasawa | ............... | G06F 3/1204 |
| 2017/0208429 A1* | 7/2017 | Asai | ............... | H04W 8/24 |
| 2018/0191666 A1* | 7/2018 | Rahman | ............... | H04L 67/16 |
| 2019/0007575 A1* | 1/2019 | Hirakata | ............... | H04N 1/00244 |

FOREIGN PATENT DOCUMENTS

| | | |
|---|---|---|
| JP | 2014-222865 A | 11/2014 |
| JP | 2016-091083 A | 5/2016 |
| JP | 2017-041254 A | 2/2017 |

* cited by examiner

TERMINAL DEVICE, NON-TRANSITORY COMPUTER-READABLE RECORDING MEDIUM STORING INSTRUCTIONS TO CONTROL THE TERMINAL DEVICE AND METHOD OF CONTROLLING TERMINAL DEVICE

CROSS-REFERENCE TO RELATED APPLICATIONS

This application claims priority under 35 U.S.C. § 119 from Japanese Patent Application No. 2017-249430 filed on Dec. 26, 2017. The entire subject matter of the application is incorporated herein by reference.

BACKGROUND

Technical Field

The present disclosures relate to a terminal device configured to perform a short-range wireless communication with a device capable of executing an imaging process, a non-transitory computer-readable recording medium storing instructions to control such a terminal device and a method of controlling a terminal device.

Related Art

There has been known a terminal device which, when located close to an image forming device, can perform a short-range wireless communication with the imaging device and cause the image forming device to perform an image forming process.

SUMMARY

The present disclosures provide an improved terminal device which, when located close to an image forming device, suitably causes the image forming device to perform an image forming process.

According to aspects of the present disclosure, there is provided a non-transitory computer-readable medium storing computer-readable instructions executable by a processor of a terminal device. The terminal device includes an operation interface and a short-range wireless communication interface configured to perform short-range wireless communication with an image processing device. The instructions causes, when executed by the processor, the terminal device to perform receiving a designating operation of designating a model of the image processing device through the operation interface, receiving a setting operation of setting an execution condition to perform an imaging process corresponding to the model designated by the designating operation, communicating with a first image processing device through the short-range wireless communication interface when the terminal device is located within a communication range of the short-range wireless communication with the first image processing device, determining whether a model of the first image processing device coincides with the designated model designated by the designating operation, and transmitting an execution instruction in accordance with the received execution condition to the first image processing device when it is determined that the model of the first image processing device coincides with the designated model.

According to aspects of the present disclosure, there is provided a terminal device. The terminal device includes an operation interface, a short-range wireless communication interface configured to perform short-range wireless communication with an image processing device, and a processor. The processor is configured to perform receiving a designating operation of designating a model of the image processing device through the operation interface, receiving a setting operation of setting an execution condition to perform an imaging process corresponding to the model designated by the designating operation, communicating with a first image processing device through the short-range wireless communication interface when the terminal device is located within a communication range of the short-range wireless communication with the first image processing device, determining whether a model of the first image processing device coincides with the designated model designated by the designating operation, transmitting an execution instruction in accordance with the received execution condition to the first image processing device when it is determined that the model of the first image processing device coincides with the designated model, and avoiding transmitting the execution instruction when it is determined that the model of the first image processing device does not coincide with the designated model.

According to aspects of the present disclosure, there is provided a method of controlling a terminal device comprising a processor, an operation interface and a short-range wireless communication interface configured to perform short-range wireless communication with an image processing device. The method including receiving a designating operation of designating a model of the image processing device through the operation interface, receiving a setting operation of setting an execution condition to perform an imaging process corresponding to the model designated by the designating operation, communicating with a first image processing device through the short-range wireless communication interface when the terminal device is located within a communication range of the short-range wireless communication with the first image processing device, determining whether a model of the first image processing device coincides with the designated model designated by the designating operation, and transmitting an execution instruction in accordance with the received execution condition to the first image processing device when it is determined that the model of the first image processing device coincides with the designated model.

BRIEF DESCRIPTION OF THE ACCOMPANYING DRAWINGS

DETAILED DESCRIPTION OF THE EMBODIMENT

<Configuration of Communication System>

Figure 1:
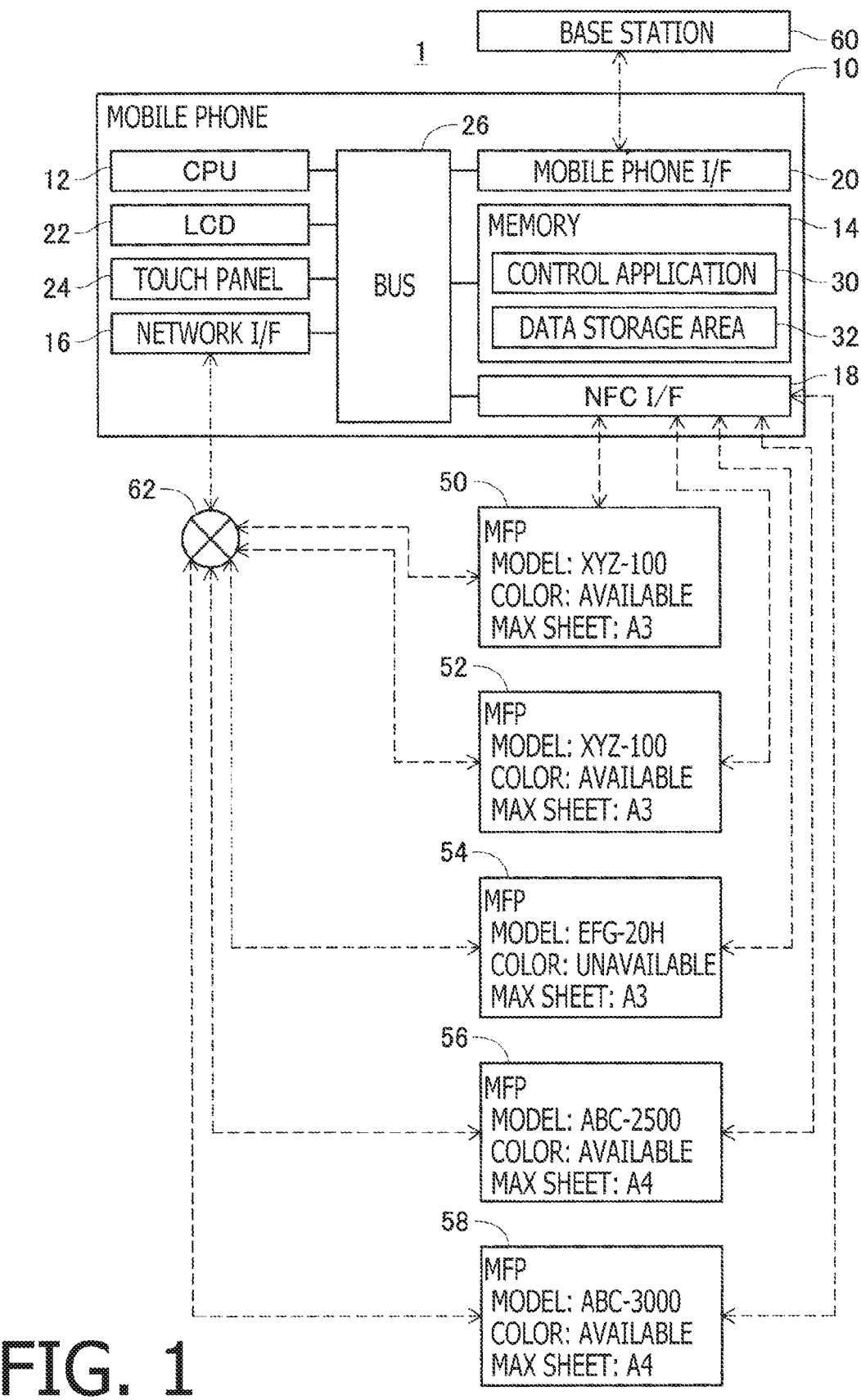
FIG. 1 is a block diagram of a communication system according to aspects of the present disclosures.

FIG. 1 shows a block diagram of a communication system 1 which is an illustrative embodiment according to aspects of the present disclosures. The communication system 1 includes a mobile phone (which is an example of a terminal device according to aspects of the present disclosures) 10, MFP's (which is an example of an image processing device according to aspects of the present disclosures) 50, 52, 54, 56 and 58, and a base station 60. Each of the MFP's 50, 52, 54, 56 and 58 is a device configured to perform imaging processes such as a scanning process and a printing process.

The mobile phone 10 mainly includes a CPU (which is an example of a processor according to aspects of the present disclosures) 12, a memory 14, a network I/F (which is an example of a network communication interface according to aspects of the present disclosures) 16, an NFC I/F (which is an example of a short-range wireless communication interface according to aspects of the present disclosures) 18, a mobile phone communication I/F 20, an LCD (an example of a display according to aspects of the present disclosures) 22, a touch panel (which is an example of an operation interface according to aspects of the present disclosures) 24, which are communicably connected through a bus 26.

The network I/F 16 is configured perform a wireless communication in accordance with a Wi-Fi method (hereinafter, simply referred to as a WF wireless communication) based on IEEE 802.11 standard and corresponding standards. That is, the mobile phone 10 is configured to perform a data communication with the MFP 50, 52, 54, 56 and 58 when the mobile phone 10 accesses a network 62 and has been in a state where the WF wireless communication can be performed.

The NFC I/F 18 is configured to perform an NFC wireless communication based on an international standard such as ISO/IEC 21481 or ISO/IEC 18092. That is, when the mobile phone 10 is in a state where the NFC wireless communication can be used, it can perform data communicate with each of the MFPs 50, 52, 54, 56 and 58. It is noted that the NFC wireless communication is a so-called short-range wireless communication, which is established when, for example, the mobile phone 10 is located close to the MFP 50, and a range between the mobile phone 10 and the MFP 50 is less than a communication range of the short-range wireless communication. Typically, the communication range of the short-range wireless communication is in a range from several centimeters to approximately one meter. Therefore, when the mobile phone 10 is located close to each of the MFP's 50, 52, 54, 56 and 58, and within a communicable range of the NFC wireless communication, the NFC wireless communication is established between the mobile phone 10 and the corresponding one of the MFP's 50, 52, 54, 56 and 58.

The mobile phone communication I/F 20 is configured to wirelessly communicate with the base station 60 in accordance with a mobile phone communication system. That is, when the mobile phone 10 becomes in a state where the wireless communication in accordance with the mobile phone communication system can be performed, the mobile phone 10 can perform data communication with another mobile phone.

The CPU 12 executes processes in accordance with a control application (which is an example of computer-readable instructions according to aspects of the present disclosures) 30 stored in the memory 14. The control application 30 is a program causing, with use of the mobile phone 10, the MFP's 50, 52, 54, 56 and 58 to perform the imaging process. In the following description, the CPU 12 executing the control application 30 may be described by the name of the program. For example, an expression such as "the control application 30 operates . . . " may be used to mean that "the CPU 12 executing the control application 30 operates . . . ."

The memory 14 includes a data storage area (which is an example of a memory) 32. The data storage area 32 is for storing data necessary for executing the control application 30. The memory 14 may be a RAM, a ROM, a flash memory, an HDD, a buffer provided to the CPU 12 or a combination of some or all of the same.

It is noted that the memory 14 may be a computer-readable storage medium. The computer-readable storage medium is a non-transitory medium. The non-transitory medium includes, in addition to the above, a CD-ROM, a DVD-ROM and the like. The non-transitory recording medium is also a tangible medium. In contrast, an electrical signal carrying a program which is, for example, downloaded from a server on the Internet is a computer-readable signal medium which is one type of the computer-readable medium but not included in the non-transitory computer-readable storage medium.

The LCD 22 has a display screen which displays functions of the mobile phone 10. A touch panel 24 has a touch sensor, which is arranged to cover the display screen of the LCD 22. The touch panel 24 is configured to detect contact or proximity of a user's finger or a touch pen relative to the touch panel 24, and output an electrical signal in accordance with detection of the user's finger or the touch pen.

<Operation of Communication System>

In the communication system 1, when the user causes the mobile phone 10 to closely approach or contact (i.e., touch) an arbitrary one of the MFP's 50, 52, 54, 56 and 58 (hereinafter, referred to an arbitrary device), thereby establishing the NFC wireless communication therebetween, an imaging job such as a printing job or a scanning job is transmitted to the arbitrary device. According to the above configuration, the user can cause the arbitrary device to execute the imaging process such as the scanning process or the printing process. It is noted that there is a case where the arbitrary device, to which the mobile phone 10 is closely located or contacted, cannot perform the imaging process in accordance with a setting condition which has been set in advance.

For example, the MFP 50 and the MFP 52 are of the same model, while the MFP 54, the MFP 56 and the MFP 58 are of models different from each other. It is noted that the MFP 56 and the MFP 58 are of different models but have the same capability. The capability is information indicating capability in executing the imaging process. For example, the capability represents whether or not a color printing can be performed, whether or not a both-side printing can be performed, usable sheet sizes for printing, whether or not a color scanning can be performed, selectable scanning resolutions and the like. According to the above example, the capabilities of the MFP 50 and the MFP 52 regarding the printing process are configured such that the color printing can be performed and the maximum usable sheet size for printing is an A3 size (297 mm×420 mm). The capability of the MFP 54 is configured such that the color printing cannot be performed, and the maximum usable sheet size for printing is the A3 size. The capabilities of the MFP 56 and the MFP 58 are configured such that the color printing can be performed and the maximum usable sheet size for printing is an A4 size (210 mm×297 mm).

When the user sets the printing condition to perform a color printing on an A3 printing sheet on the mobile phone 10, and brings the mobile phone 10 to touch with or to be closer to one of the MFP 54, 56 or 58, none of the MFP's 54, 56 and 58 can perform the printing process in accordance with the set printing condition. In such a case, conventionally, the user need to find a location of the devices which can perform the printing process in accordance with the set printing condition (i.e., the locations of the MFP's 50 and 52) and bring the mobile phone 10 to touch with or to be closer to the MFP 50 or 52. Alternatively, the user may reset the printing condition to have settings according to which the printing process may be performed with the MFP 54, 56 or 58 so as to cause the MFP 54, 56 or 58 to perform the printing process. However, according to such a method, the user is required to perform troublesome operations and the printing process cannot be performed readily.

In the following description, when it is described that the mobile phone 10 having the NFC communication function is brought to touch with an MFP to establish the NFC communication, it also includes a case where the mobile phone 10 does not actually touch but is located sufficiently close to the MFP so that the NFC communication can be established.

According to the present embodiment, the user is firstly encouraged to select (i.e., designate) a model of a device which is to perform the imaging process (e.g., the printing process) on the mobile phone 10. Then, a setting screen on which only a setting condition applicable to the model selected by the user (hereinafter, referred to as a selected model) is displayed on the LCD 22 of the mobile phone 10. Thereafter, in accordance with the setting condition set by the user on the setting screen, an imaging job is generated. Then, when the user causes the mobile phone 10 to approach an arbitrary device (e.g., an arbitrary image processing device), the arbitrary device and the mobile phone 10 establish the NFC wireless communication. At this stage, if the mode of the device (hereinafter, referred to as a communicating device) which has established the NFC wireless communication with the mobile phone 10 and the selected model coincide with each other, the imaging job is transmitted to the communicating device. That is, the imaging job generated in accordance with the setting condition applicable to the device of the model which is the same as the communicating device is transmitted to the communicating device. Accordingly, it is ensured that the user can cause the device (i.e., the communicating device), with which the mobile phone 10 is brought to touch, to perform the imaging process in accordance with the imaging job.

Figure 2:
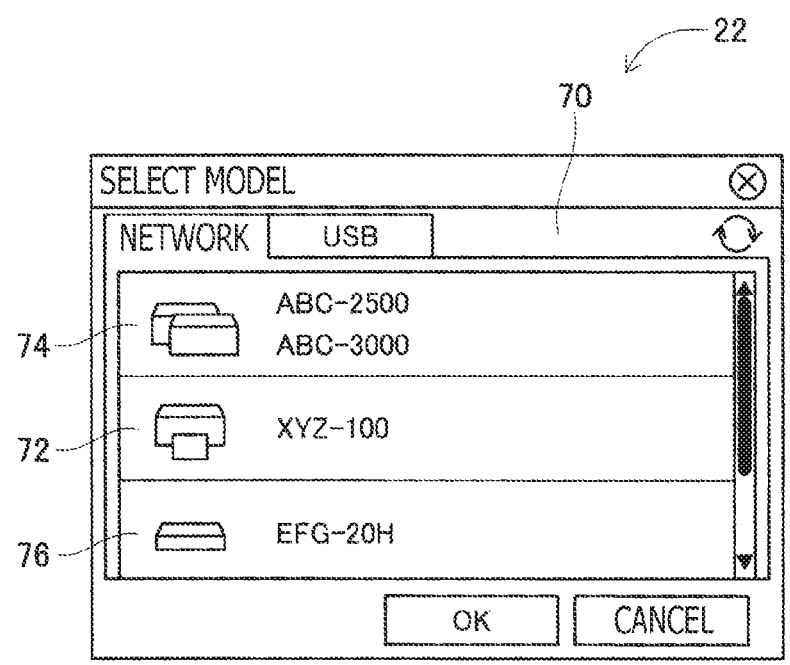
FIG. 2 is an example of a selection screen.

Concretely, a search button (not shown) is firstly displayed on the LCD 22 of the mobile phone 10 to search for models of devices which can communicate with the mobile phone 10. When the search button is operated, models of devices which are communicable with the WF wireless communication are searched for. According to the present embodiment, as the models of the devices which are communicable with the mobile phone 10, five MFP's 50, 52, 54, 56 and 58 are found. Then, as shown in FIG. 2, a selection screen 70 allowing the user to select one of the models of the MFP's 50, 52, 54, 56 and 58 is displayed on the LCD 22.

On a conventional selection screen, identifying information such as device names or IP addresses of the found devices are displayed as selection buttons so that any of the devices can be selected. That is, the selections buttons are displayed for respective devices. Therefore, in an environment where multiple devices of the same model exist, the user needs to identify a desired device to be used for printing from among the devices of the same model referring to the identifying information or the like, and select the desired device. Generally, a device name or an IP address of a device is displayed by operating an operation interface of the device. Therefore, the user is required to perform such a troublesome checking work to identify the device to be selected.

In contrast, on the selection screen 70 according to the present embodiment, model names of devices are displayed as selection buttons (i.e., as selectable options of devices). That is, for multiple devices of the same model, only one selection button is displayed on the selection screen 70. In other words, one selection button for selecting multiple devices of the same model is displayed.

Further, even if multiple devices are not of the same model, if the multiple devices are of the same capability, a single selection button is displayed corresponding to the multiple devices. That is, for multiple devices of the same capability, only one selection button is displayed on the selection screen 70. Typically, a model name of a device is indicated on an outer surface of the device, and the user can easily check the same. Therefore, even in an environment where multiple devices of the same model are provided, the user can easily select the model without checking the identifying information of the device.

For example, the MFP 50 and the MFP 52 are of the same model as mentioned above, and a model name thereof is "XYZ-100." In such a case, a selection button 72 for selecting the model name "XYZ-100" is displayed on the selection screen (see FIG. 2). Further, the MFP 56 and the MFP 58 are of the same capability as mentioned above. The model name of the MFP 56 is "ABC-2500" and the model name of the MFP 58 is "ABC-3000." Therefore, for the MFP's 56 and 58, a selection button 74 for selecting the model names "ABC-2500" or "ABC-3000" is displayed on the selection screen 70 (see FIG. 2). It is noted that information indicating model of a device (hereinafter, referred to as model information) and information indicating capability of a device (hereinafter, referred to as capability information) are obtained from each device when the devices are found.

Further, in the found devices, there is no device of the same model or the same capability of the MFP 54 except for the found MFP 54. Therefore, one selection button corresponding to the MFP 54 is displayed. Specifically, a model name of the MFP 54 is "EFG-20H" and a selection button 76 for selecting the model name "EFG-20H" is displayed on the selection screen 70 (see FIG. 2).

When one of the three selection buttons 72, 74 and 76 displayed on the selection screen 70 is operated, capability information of a model corresponding to the operated button (i.e., the selected model) is identified, and the setting screen (not shown) corresponding to the identified capability information is displayed on the LCD 22. The setting screen is for setting an execution condition of the imaging process, and only setting items corresponding to the capability information are displayed.

For example, when the selection button 72 is operated, that is, when the model "XYZ-100" corresponding to the MFP 50 and the MFP 52 is selected as the selected mode, a setting screen on which a color printing can be selected and the A3 size can be selected as the maximum usable sheet is displayed on the LCD 22. For another example, when the selection button 74 is operated, that is, when the models "ABC-2500" and "ABC-3000" respectively corresponding to the MFP 56 and MFP 58 are selected, a setting screen on which a color printing can be selected and the A4 size can be selected as the maximum usable sheet is displayed on the LCD 22. For a further example, when the selection button 76 is operated, that is, when the model "EFG-20H" corresponding to the MFP 54 is selected, a setting screen on which a color printing cannot be selected and the A3 size can be selected as the maximum usable sheet is displayed on the LCD 22.

On the LCD 22 of the mobile phone 10, the print button and the scan button are displayed. When one of the print button and the scan button is operated after the setting items are set on the setting screen, an imaging job corresponding to the operated button is generated in the mobile phone 10.

When the print button is operated, a printing job is generated. At this time, image data corresponding to the setting items set on the setting screen (i.e., the printing condition) is generated as the printing job. The image data is generated based on the printing condition, and the image data itself may include information corresponding to the printing condition. When the scan button is operated, a scanning job is generated. At this time, the setting items set on the setting screen (i.e., the scanning condition) is generated as the scanning job. The generated imaging job (e.g., the printing job or the scanning job) are stored in the data storage area 32.

Next, the mobile phone 10 obtains status information from the devices of the selected model through the WF wireless communication. For example, when the model of the MFP 50 and the MFP 52 is selected as the selected model, the status information is obtained from each of the two MFP's 50 and 52. When the model of the MFP 54 is selected as the selected model, the status information is obtained only from the MFP 54. It is noted that the status information includes information indicating a communication condition of the device, information indicating errors such as shortage of ink, paper jam and the like, and information indicating whether the device is powered on. Each of the MFPs 50, 52, 54, 56 and 58 may be configured such that a unit for performing the imaging process (e.g., a printer or a scanner) and a unit for performing the WF wireless communication (e.g., a network I/F) are separately powered on. Further, the status information transmitted from the MFPs 50, 52, 54, 56 and 58 may include information indicating whether the unit for performing the imaging process is powered on.

Then, based on the status information, the CPU 12 determines whether the devices of the selected model can perform the imaging process. It is noted that, when the status information includes information indicating that the communication condition of the device is bad, information indicating an error, information indicating that the device is not powered on or the like, the CPU 12 determines that the devices of the selected model cannot perform the imaging process. Also, when the status information cannot be obtained from a device of the selected model, the CPU 12 determines that the device cannot perform the imaging process. When determined that the imaging process cannot be performed, the device is not displayed on the LCD 22. Only the devices capable of performing the imaging process are displayed on the LCD 22. That is, when the MFP's 50 and 52 are selected as the devices of the selected model, and when the CPU 12 determines that the MFP 52 cannot perform the imaging process, only the MFP 50 is displayed on the LCD 22 as the device capable of performing the imaging process.

After operating the print button or the scan button, the user brings the mobile phone 10 to touch with or to be closer to the device. The CPU 12 determines whether the model of the device to which the mobile phone 10 has been moved close thereto is the selected model. When the model of the device to which the mobile phone 10 has been moved close thereto is the selected model, the imaging job is transmitted to the device, and the device performs the imaging process based on the imaging job. However, there could be a case where the user inadvertently causes the mobile phone 10 to approach a device of a model which is different from the selected model. In such a case, as aforementioned, since the imaging process cannot be performed by the device to which the mobile phone 10 has been approached, the imaging job is not transmitted to the device.

When the user causes the mobile phone 10 to approach an arbitrary device, and the mobile phone 10 is located within a communication range of the NFC wireless communication, the NFC wireless communication is established between the device and the mobile phone 10. That is, the NFC wireless communication is established between the communicating device and the mobile phone 10. At this time, the mobile phone 10 obtains information indicating a model of the communicating device (hereinafter, referred to as communicating model information) from the communicating device through the NFC wireless communication. Then, the CPU 12 of the mobile phone 10 determines whether model information of the selected model having been obtained at the time of searching for the device (hereinafter, referred to as selected model information) and the communicating model information coincide with each other. When the selected model information and the communicating model information do not coincide with each other, there is a possibility that the communicating device cannot perform the imaging job which is created based on the capability information (i.e., based on the setting items corresponding the capability information) of the selected model. Therefore, in such a case, the imaging job is not transmitted to the communicating device.

On the other hand, when the selected model information and the communicating model information coincide with each other, the communicating device can perform the imaging job which is generated based on the capability information of the device of the model same as the model of the communicating device. Accordingly, when the selected model information and the communicating model information coincide with each other, the imaging job is transmitted to the communicating device as an execution instruction of the imaging process through the WF wireless communication.

It is noted that there could be a case where the communicating device has already been performing the imaging process. In such a case, even if the mobile phone 10 transmits the imaging job to the communicating device, the communicating device cannot immediately perform a process based on the newly transmitted imaging job. Therefore, the mobile phone 10 obtains a process execution status of the communicating device before transmitting the imaging job to the communicating device. When the obtained process execution status indicates that a process is being executed, a message indicating such a status is displayed on the LCD 22 of the mobile phone 10 and the imaging job is not transmitted to the communicating device.

Accordingly, the user can recognize that the device is performing another imaging process. After the process being executed by the device is completed, by making the mobile phone 10 approach the communicating device again, the imaging job is transmitted to the communicating device. Then, the communicating device performs the imaging process based on the imaging job. Alternatively, if there is another device other than the communicating device of the same model as the selected model, for example, when the selection button 72 or 74 was operated at the time of model selection, the user may cause the mobile phone 10 to approach a device different from the communicating device after the user recognizes that the communicating device is performing another imaging process. Then, the imaging process based on the imaging job can be performed by the device different from the communicating device which is performing another imaging process.

When the printing job is transmitted to the communicating device as an imaging job, that is, when the printing process is selected as the imaging process, the printing job is transmitted to the communicating device and the printing process is performed by the communicating device. In that case, there is a possibility that the printing process is not appropriately performed due to occurrence of a sheet jam during the printing process. In order to deal with such an error of the printing process, the mobile phone 10 is configured to refer to a flag (hereinafter, referred to as a processing status flag) indicating a processing status of the imaging process based on the imaging job to be transmitted.

Specifically, in the mobile phone 10, the processing status flag corresponding to the printing job is set to one of "BEFORE EXECUTION," "DURING EXECUTION" and "EXECUTION FAILED." The processing status flag "BEFORE EXECUTION" indicates that the printing process based on the printing job transmitted from the mobile phone 10 has not been executed. The processing status flag "DURING EXECUTION" indicates that the printing process based on the printing job transmitted from the mobile phone 10 is being executed. Further, the processing status flag "EXECUTION FAILED" indicates that the printing process based on the printing job transmitted from the mobile phone 10 fails. It is noted that an initial value of the processing status flag is "BEFORE EXECUTION."

Before transmitting the printing job to the communicating device, the mobile phone 10 determines which of "BEFORE EXECUTION," "DURING EXECUTION" and "EXECUTION FAILED" is set to the processing status flag.

When it is determined that the processing status flag is set to "DURING EXECUTION," the printing process based on the printing job transmitted from the mobile phone 10 is being executed by the communicating device. That is, the printing job has already been transmitted from the mobile phone 10 to the communicating device. Therefore, when the processing status flag is set to "DURING EXECUTION," the printing job is not transmitted from the mobile phone 10 to the communicating device.

When it is determined that the processing status flag is set to "BEFORE EXECUTION," the printing process based on the printing job transmitted from the mobile phone 10 has not been executed by the communicating device. That is, the printing job has not been transmitted from the mobile phone 10 to the communicating device. Therefore, when the processing status flag is set to "BEFORE EXECUTION," the printing job is transmitted from the mobile phone 10 to the communicating device. Then, in the mobile phone 10, the processing status flag is set to "DURING EXECUTION."

The communicating device which has received the printing job starts executing the imaging process, that is, the printing process based on the received printing job. When the communicating device has finished the printing process, a completion notification is transmitted from the communicating device to the mobile phone 10. Upon receipt of the completion notification from the communicating device, the mobile phone 10 deletes the printing job stored in the data storage area 32. At this time, the mobile phone 10 also deletes the processing status flag corresponding to the deleted printing job.

When the printing process is stopped before completion due to the sheet jam or the like during execution of the printing process in the communicating device, that is, when execution of the printing process fails, a failure notification is transmitted from the communicating device to the mobile phone 10. Upon receipt of the failure notification, the mobile phone 10 sets the processing status flag to "EXECUTION FAILED." Further, upon receipt of the failure notification, the mobile phone 10 determines whether there is a device of a model which is the same as the selected model besides the communicating device. That is, in such a case, the mobile phone 10 determines whether there is a device of a model which is the same as the selected model or there is a device of which capability is the same as that of the communicating device.

For example, when the selection button 72 is operated when the model selection is performed and the model of the MFP 50 and the MFP 52 is selected as the selected model, if the user causes the mobile phone 10 to approach the MFP 50, the MFP 50 is used as the communicating device. When the printing process by the MFP 50 fails, the mobile device 10 determines that there is only one more device (i.e., the MFP 52) of the model same as the selected model other than the communicating device (i.e., the MFP 50). In such a case, the printing job is transmitted from the mobile phone 10 to the MFP 52 through the WF wireless communication. It is because there is only one device which is capable of executing the printing job generated in accordance with the capability of the selected model other than the communicating device which had failed the printing process. According to the above configuration, when the printing process by the communicating device fails, the user can cause another device different from the communicating device to execute the printing process which was failed, without moving the mobile phone 10 approach another device.

According to the communication system 1, two MFP's 50 and 52 are of the same model. If there are three MFP's of the same model, one selection button is displayed to select the model corresponding to the three MFP's on the selection screen 70. When the selection button is selected, the model of the three MFP's is selected as the selected model. When the user causes the mobile phone 10 to approach one of the three MFP's, the printing job is transmitted to the MFP and the printing process executed by the MFP fails, the mobile phone 10 determines that there remain two MFP's of the same model. That is, there are two devices capable of executing the printing job which is generated in accordance with the capability of the selected model other than the device which had failed the printing process. Thus, the user can select one device from the two devices. Therefore, when there remains two or more devices of the same model when the printing process executed by the firstly selected device fails, the printing job is not transmitted to the devices through the WF wireless communication. After the user causes the mobile phone 10 to approach a desired one of the devices, the printing job is transmitted to the user-desired device. According to this configuration, the printing process which had failed can be executed by the user-desired device.

There could be a case where it is determined that there remains no device of the model same as the selected model. For example, in a state where the selection button 76 is selected on the selection screen 70 and thereby the MFP 54 is selected as a selected model, when the user causes the mobile phone 10 to approach the MFP 54 and the printing process executed by the MFP 54 fails, there remains no device which can execute the printing job generated in accordance with the capability of the selected model other than the communicating device which had failed the printing process. In such a case, by eliminating the cause of the failure (e.g., by removing the jammed sheet) in the MFP 54 so that the MFP 54 is in a state to execute the printing process, and by causing the mobile phone 10 to approach the MFP 54, the user can cause the MFP 54 to execute the printing process.

When the printing process executed by the MFP 54 fails and the user causes the mobile phone 10 to approach the MFP 54 again, or when the printing process executed by the communicating device fails and the user causes the mobile phone 10 to approach one of multiple devices of the selected model except for the communicating device, the processing status flag is set to "EXECUTION FAILED." Thus, when it is determined which of "BEFORE EXECUTION," "DURING EXECUTION" or "EXECUTION FAILED" is set to the processing status flag, and it is determined that the processing status flag is set to "EXECUTION FAILED," the printing job is transmitted to the device to which the mobile phone 10 is approached. That is, when the processing status flag is "EXECUTION FAILED" or "BEFORE EXECUTION," the printing job is transmitted to the device to which the mobile phone 10 is approached.

When there are two or more devices of the selected model, for example, when the selection button 72 or 74 is operated when a model is selected, the printing process based on the printing job can be executed with use of the multiple devices. Specifically, in the mobile phone 10, a setting to execute the printing process with use of the multiple devices (hereinafter, referred to as a multiple-device printing process setting) is done. The multiple-device printing process setting may be set when the setting items of the imaging process are set, that is, through on the setting screen. Alternatively or optionally, when the user causes the mobile phone 10 to approach a device, a setting button to set the multiple-device printing process setting may be displayed on the LCD 22, and the multiple-device printing process setting may be set when the user operates the setting button for the multiple-device printing process setting.

Further, the multiple-device printing process setting may be set based on history information. For example, in the mobile phone 10, transmission history information of the printing jobs and history of the multiple-device printing process setting are stored, and when the selected model of a transmission destination of the printing job is a model to which the multiple-device printing process setting is always set, the multiple-device printing process setting may be set automatically.

When the multiple-device printing process setting is set according to the above method, on the mobile phone 10, the printing job is divided into multiple printing jobs. For example, the model of the MFP 50 and the MFP 52 is selected as the selected model, a 100-page printing job is divided into a first printing job for printing 1st-50th pages and a second printing job for printing 51st-100th pages. When the user causes the mobile phone 10 to approach the MFP 50 and the NFC wireless communication is established between the MFP 50 and the mobile phone 10, the first printing job is transmitted to the MFP 50. Thereafter, when the user causes the mobile phone 10 to approach the MFP 52 and the NFC wireless communication is established between the MFP 52 and the mobile phone 10, the second printing job is transmitted to the MFP 52. According to the above configuration, the printing processes are executed by both the MFP 50 and the MFP 52 in parallel, and a time period necessary for printing all the pages can be shortened.

In a case where the scanning job is transmitted to the communicating device as the imaging job, in other words, when the scanning process is selected as the imaging process, when the user causes the mobile phone 10 to approach the device and the NFC wireless communication is established therebetween, the scanning job is transmitted to the device, thereby the scanning process being executed in the device. It is noted, however, if the original document is not set to the device to which the mobile phone 10 approaches (i.e., the communicating device), the communicating device cannot perform the scanning process. Therefore, the mobile phone 10 obtains set information indicating whether the original document is set from the communicating device with use of the NFC wireless communication. When the set information indicates that the original document is not set to the communicating device, the scanning job is not transmitted to the communicating device. When the set information indicates that the original document is set, the scanning job is transmitted to the communicating device. Accordingly, the scanning job is performed by the communicating device.

Specifically, in the mobile phone 10, the processing status flag corresponding to the scanning job is set to "BEFORE EXECUTION" or "DURING EXECUTION." When the processing status flag is set to "BEFORE EXECUTION," it is indicated that the scanning process based on the scanning job transmitted from the mobile phone 10 has not yet been executed by the communicating device. The processing status flag "DURING EXECUTION" indicates that the scanning job transmitted from the mobile phone 10 is being executed by the communicating device. It is noted that an initial value of the processing status flag it "BEFORE EXECUTION."

Before transmitting the scanning job to the communicating device, the mobile phone 10 determines which of "BEFORE EXECUTION" and "DURING EXECUTION" is set to the processing status flag. When it is determined that the processing status flag is set to "BEFORE EXECUTION," the scanning process based on the printing job transmitted from the mobile phone 10 has not been executed by the communicating device. That is, the scanning job has not been transmitted from the mobile phone 10 to the communicating device.

Therefore, when the processing status flag is set to "BEFORE EXECUTION," the scanning job is transmitted from the mobile phone 10 to the communicating device. Then, in the mobile phone 10, the processing status flag is set to "DURING EXECUTION."

The communicating device which has received the scanning job starts executing the scanning process based on the scanning job. When the communicating device has finished the scanning process, the scan data generated in the scanning process is transmitted from the communicating device to the mobile phone 10. At this time, the mobile phone 10 stores the received scan data in the data storage area 32. Further, when the scanning process is completed, a completion notification is transmitted from the communicating device to the mobile phone 10. Upon receipt of the completion notification from the communicating device, the mobile phone 10 deletes the scanning job stored in the data storage area 32. At this time, the mobile phone 10 also deletes the processing status flag corresponding to the deleted scanning job. According to the above configuration, the scanning process performed only by one device has been completed.

It is noted that, the communicating device is configured to perform the scanning process using not only one device but multiple devices can be performed. As described above, when the scanning job is transmitted from the mobile phone 10 to the communicating device, the processing status flag is set to "DURING EXECUTION." Thereafter, when the scanning process by the communicating device has completed and the completion notification is transmitted from the communicating device to the mobile phone 10, the processing status flag is deleted. That is, after the scanning job is transmitted to from the mobile phone 10 to the communicating device, and until the mobile phone 10 receives the completion notification, the processing status flag is set to "DURING EXECUTION." Therefore, after the user causes the mobile phone 10 to approach a first device and the scanning job is transmitted to the first device, when the user causes the mobile phone 10 to approach a second device which is different form the first device before the first device transmits the completion notification to the mobile phone 10, the processing status flag is set to "DURING EXECUTION."

In such a case, if an original document is set to the second device, a scanning job the same as one transmitted to the first device is transmitted to the second device. Then, in the second device, the scanning process based on the transmitted scanning job is performed. When the scanning process in the second device is completed, scan data generated in the scanning process is transmitted from the second device to the mobile phone 10. Also in the first device, the scanning process is performed based on the transmitted scanning job, and the scan data is transmitted to the mobile phone 10 upon completion of the scanning process. Thus, from the first device and the second device, the scan data is transmitted to the mobile phone 10. In this case, the mobile phone 10 merges the scan data received from the first device and the scan data received from the second device. The merged scan data is stored in the data storage area 32. According to the above configuration, the scanning processes respectively performed by the two devices are completed. As described above, since the mobile phone 10 is configured to transmit the same scanning job to multiple devices, and merge the scan data respectively received from the multiple devices, a time period required for the scanning process can be shortened.

<Process of Control Application>

Figure 3:
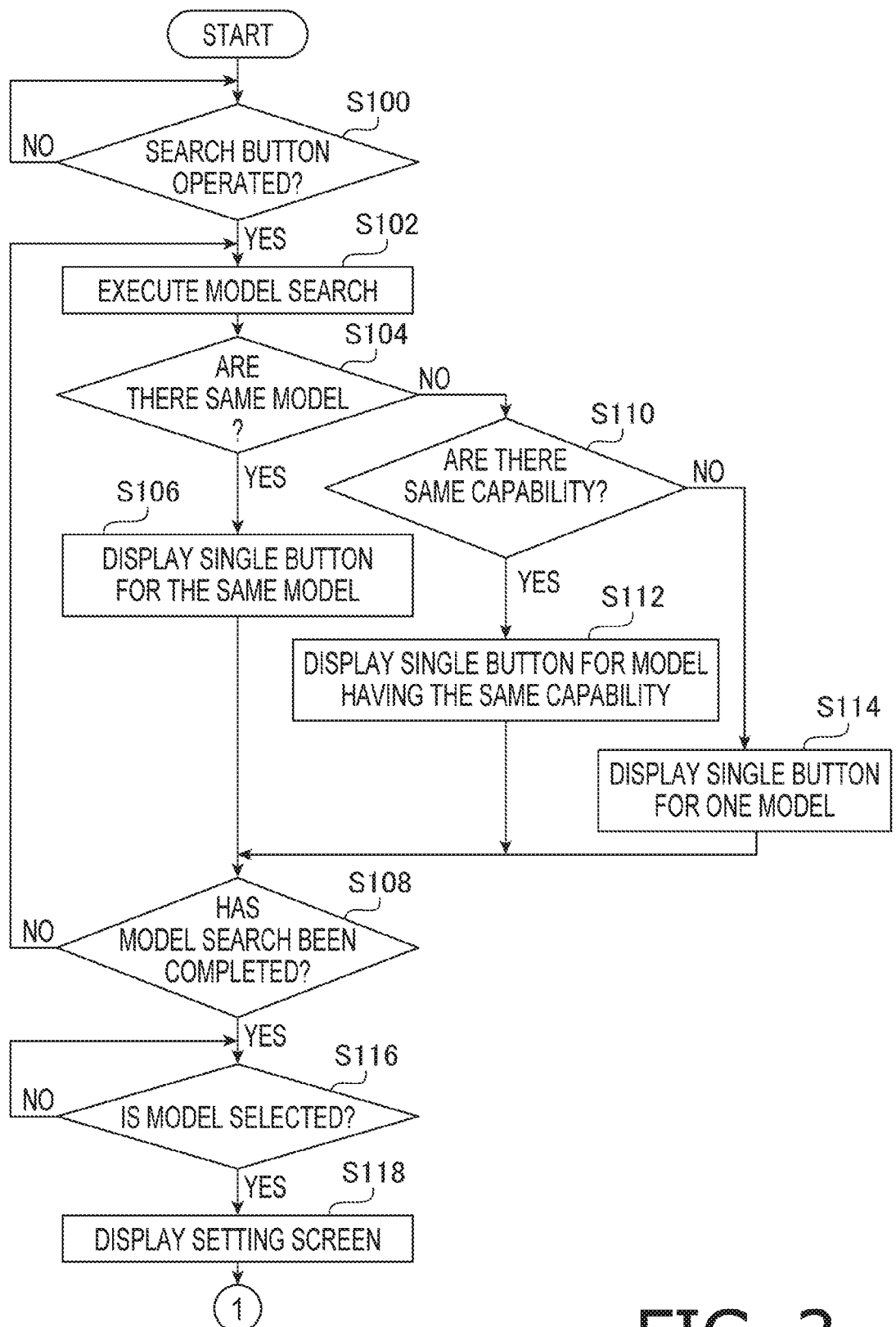
FIGS. 3 and 4 show a flowchart illustrating an imaging job generating process executed by a control application.
Figure 4:
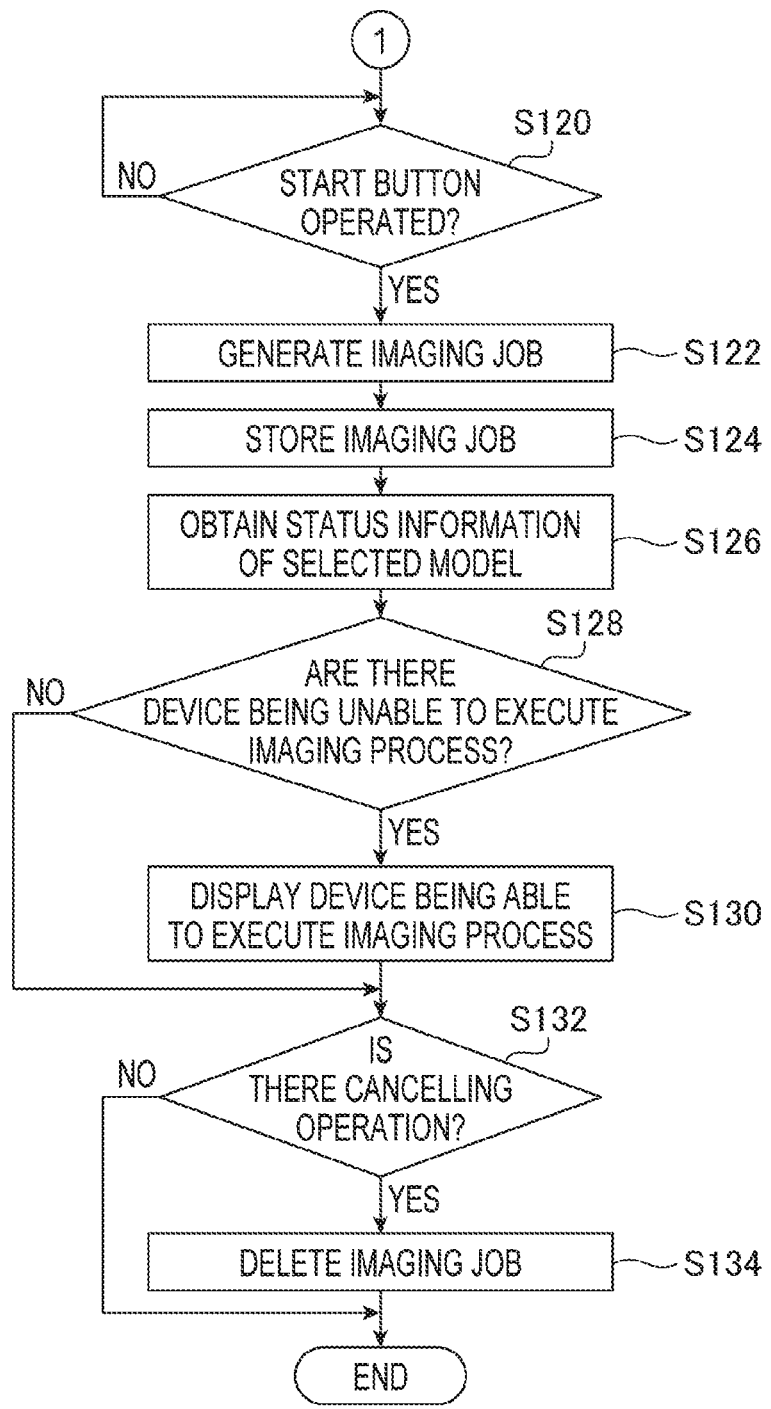
Figure 5:
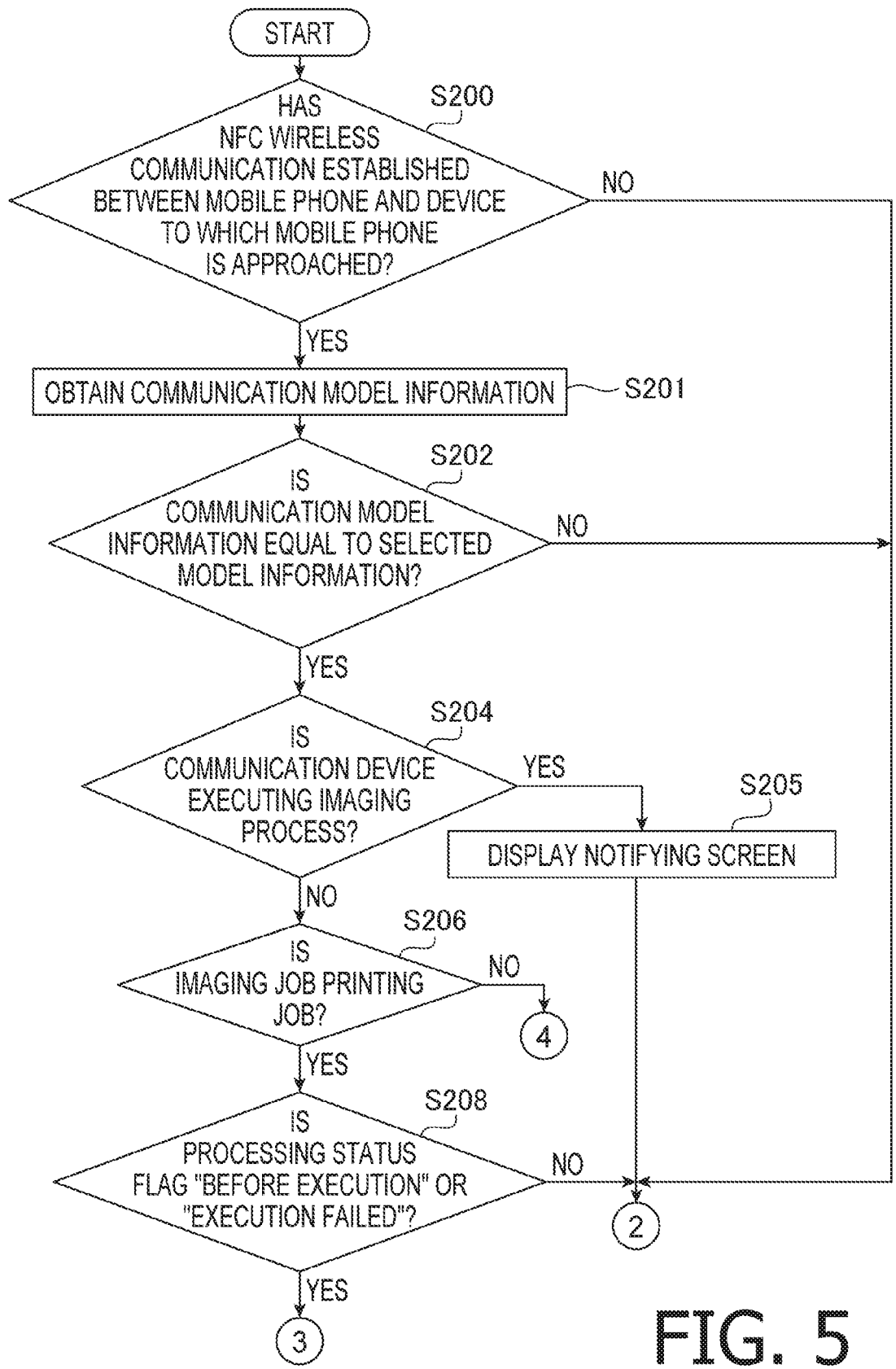
FIGS. 5, 6 and 7 show a flowchart illustrating an imaging job transmitting process executed by a control application.
Figure 6:
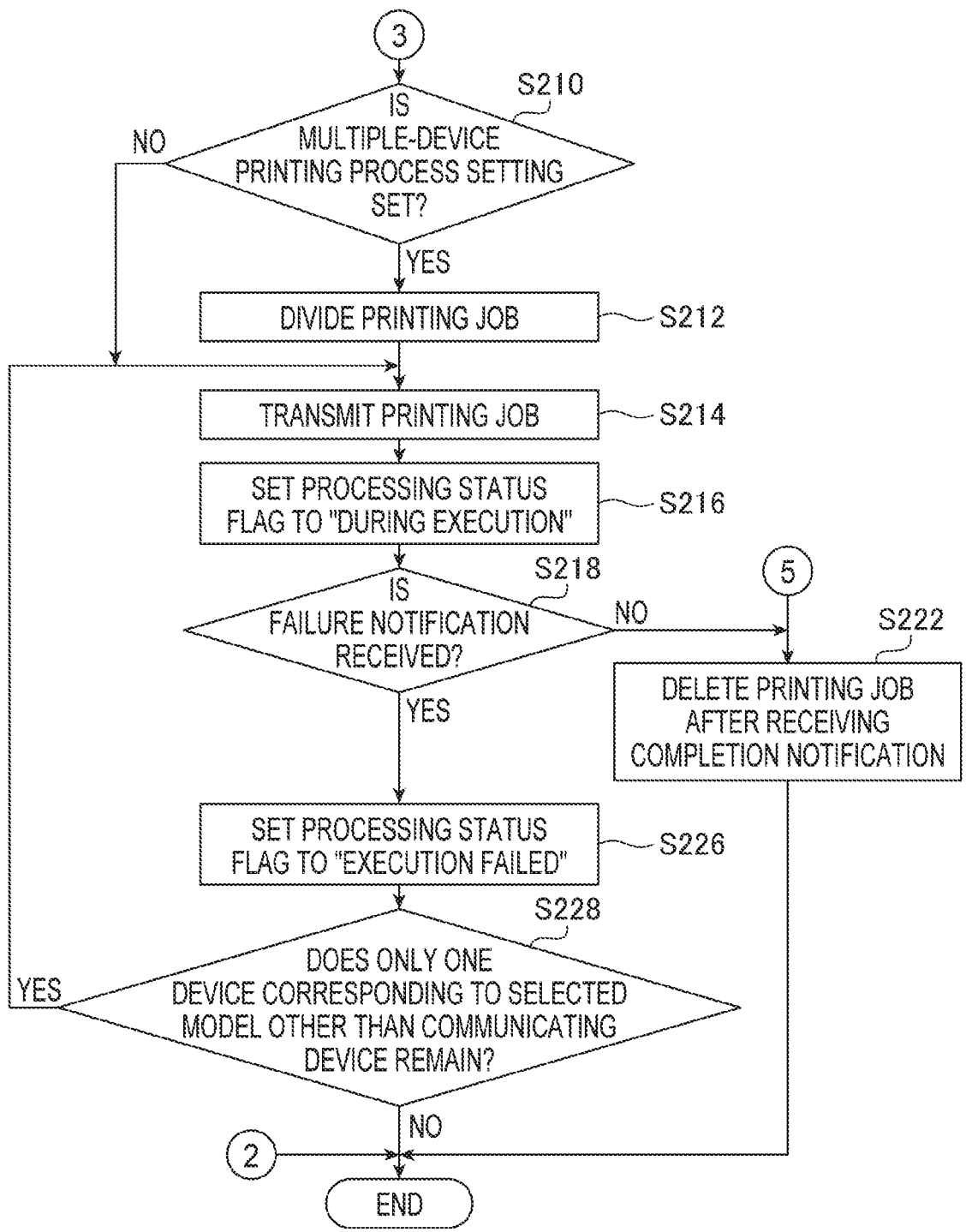
Figure 7:
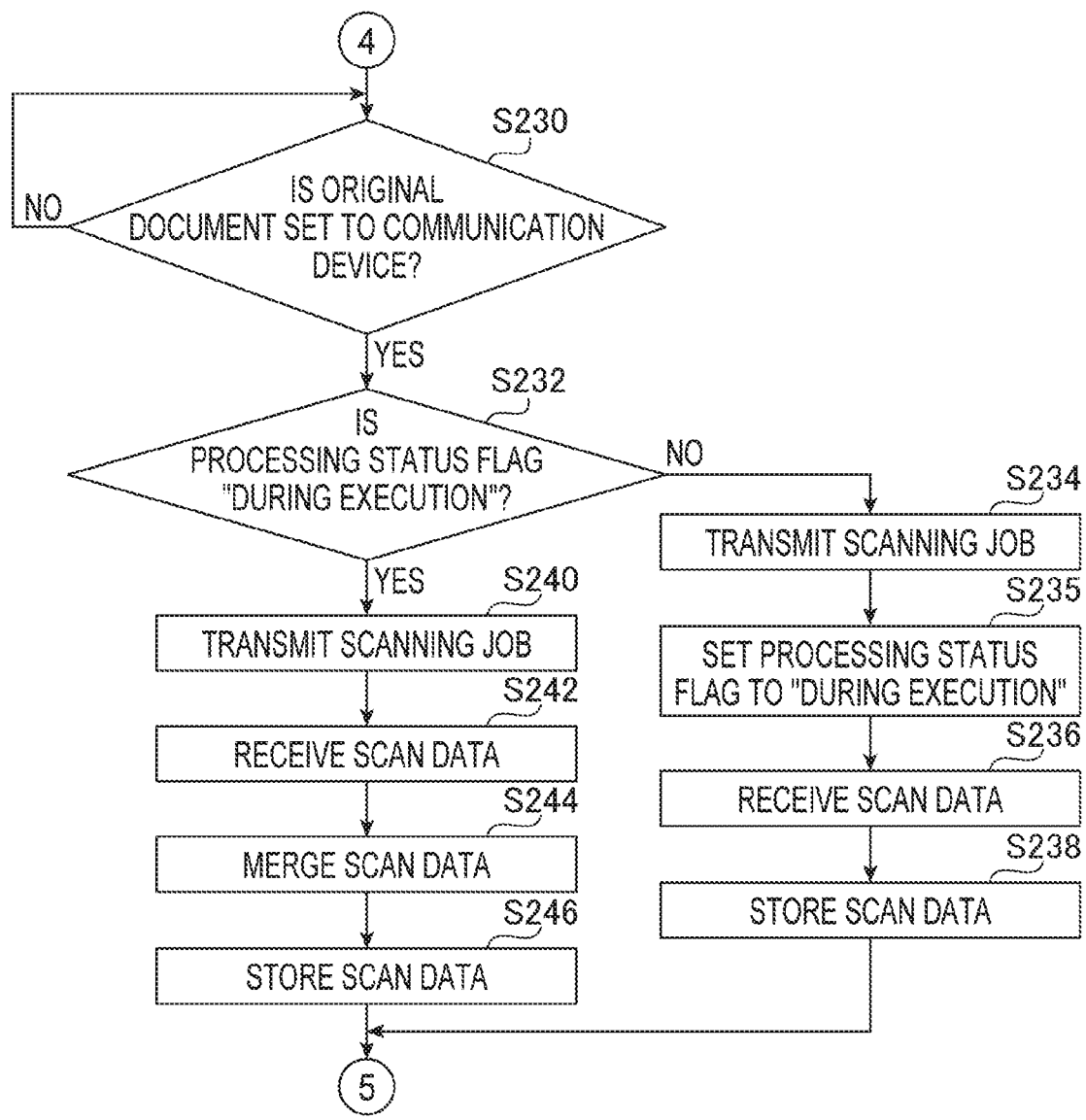

The above-described printing process and scanning process are executed as a control application 30 is executed by the CPU 12. Hereinafter, referring to FIGS. 3-7, the process when the control application 30 is executed will be described. FIGS. 3 and 4 show an imaging job generating process and include processes related to selection of a device and generation of the imaging job corresponding to the selected model. FIGS. 5-7 show an imaging job transmitting process and include processes related to communication with the device and transmission of the imaging job to the device.

When the process shown in FIGS. 3 and 4 is started, the control application 30 firstly determines whether the search button is operated (FIG. 3: S100). When the search button is not operated (S100: NO), the control application 30 repeats S100. When the search button is operated (S100: YES), the control application 30 searches for the models of the devices which are capable of communicating with the mobile phone 10 with use of the WF wireless communication (S102). Then, the control application 30 determines whether there exists a model which is the same as the model of the devices found (S104). When there exists the same model (S104: YES), the control application 30 displays a button for selecting the same model with a single selection button 72 on the selection screen 70 (S106). Then, the control application 30 proceeds to S108.

When a model same as the model of the devices found does not exit (S104: NO), the control application 30 determines whether there exists a model having capability which is the same as the capability of the found model (S110). That is, the control application 30 compares capabilities of the respective found devices. When there exists the model having the capability same as the capability of the found model (S110: YES), the control application 30 displays a button for selecting the model having the same capability with a single selection button 74 on the selection screen 70 (S112). Then, the control application 30 proceeds to S108.

When a model having capability same as the capability of the found model does not exist (S110: NO), the control application 30 displays a button for selecting model corresponding to only one device with a single selection button 76 on the selection screen 70 (S114). Then, the control application 30 proceeds to S108. In S109, the control application 30 determines whether the model search has been completed for all the devices which are capable of communicating with the mobile phone 10 (S108). When the model search has not been performed for all the devices communicable with the mobile phone 10 (S108: NO), the control application 30 returns to S102.

When the model search for all the devices communicable with the mobile phone 10 has been completed (S108: YES), the control application 30 determines whether a model is selected on the selection screen, that is, whether one of the selection buttons 72, 74 and 76 is operated on the selection screen 70 (S116). When it is determined that one of the selection buttons 72, 74 and 76 is operated (S116: YES), the control application 30 displays a setting screen corresponding to the capability of the selected model (i.e., the selected button) on the LCD 22 (S118). Thus, on the setting screen, the execution condition of the imaging process can be set by the user. When none of the buttons 72, 74 and 75 has been operated (S116: NO), the control application 30 repeats S116.

Next, the control application 30 determines whether the print button or the scan button (i.e., a start button) has been operated (FIG. 4: S120). When it is determined that the start button has not been operated (S120: NO), the control application 30 repeats S120. When it is determined that the start button has been operated (S120: YES), the control application 30 generates an imaging job corresponding to the button determined to be operated in S120 in accordance with the setting condition set through the setting screen displayed in S118 (S122). That is, when the print button is operated in S120, the control application 30 generate the printing job in accordance with the printing condition set through the setting screen. When the scan button is operated in S120, the control application 30 generates the scanning job in accordance with the scanning condition set through the setting screen.

Next, the control application 30 stores the generated imaging job in the data storage area 32 (S124). Then, the control application 30 obtains status information from the model selected in S116, that is, from the devices of the selected model (S126). When obtaining the status information, the control application 30 determines whether there exists a device, among the devices of the selected mode, which is unable to execute the imaging process based on the obtained status information (S128). When there exists the device unable to execute the imaging process (S128: YES), the control application 30 displays only the device(s) able to execute the imaging process on the LCD 22 (S130). Then, the control application 30 proceeds to S132.

When there exists no device unable to execute the imaging process (S128: NO), the control application 30 skips S130, and proceeds to S132. In S132, the control application 30 determines whether there is a cancelling operation (S132). When there is the cancelling operation (S132: YES), the control application 30 deletes the imaging job stored in S124 (S134). Then, the process shown in FIGS. 3 and 4 is terminated. When there is no cancelling operation (S132: NO), the control application 30 skips S134 and terminates the process shown in FIGS. 3 and 4. It is noted that the process shown in FIGS. 3 and 4 is repeated at every particular interval when the search button is displayed on the screen displayed on the LCD 22 by the control application 30.

Further, the control application 30 determines whether the NFC wireless communication has been established between the mobile phone 10 and the device to which the mobile phone 10 is approached (FIG. 5: S200). When it is determined that the NFC wireless communication has not been established (S200: NO), the present process is terminated. When it is determined that the NFC wireless communication has been established (S200: YES), the control application 30 obtains the communicating model information from the device with which the NFC wireless communication is established (i.e., the communicating device) with use of the NFC wireless communication (S201).

Next, the control application 30 determines whether the communicating model information and the selected model information coincide with each other (S202). When the communicating model information and the selected model information do not coincide with each other (S202: NO), the present process is terminated. In that case, the control application 30 avoids transmission of the imaging job stored in S124. When the communicating model information and the selected model information coincide with each other (S202: YES), the control application 30 obtains a process execution status from the communicating device, and determines, based on the obtained process execution status, whether the communicating device is executing the imaging process (S204).

When it is determined that the imaging process is being executed by the communicating device (S204: YES), the control application 30 displays a notifying screen indicating that the communicating device is executing the imaging process on the LCD 22 (S205). Then, the present process is terminated. When it is determined that the imaging process is not being executed by the communicating device (S204: NO), the control application 30 determines whether the imaging job stored in S124 is the printing job (S206). When it is determined that the stored imaging job is the printing job (S206: YES), the control application 30 determines whether the processing status flag is "BEFORE EXECUTION" or "EXECUTION FAILED" (S208).

When it is determined that the processing status flag is not "BEFORE EXECUTION" or "EXECUTION FAILED" (S208: NO), that is, when the processing status flag is "DURING EXECUTION," the present process is terminated. When it is determined that the processing status flag is "BEFORE EXECUTION" or "EXECUTION FAILED" (S208: YES), the control application 30 determines whether the multiple-device printing process setting is set (FIG. 6: S210). When it is determined that the multiple-device printing process setting is set (S210: YES), the control process 30 divides the printing job into a plurality of printing jobs (S212), and proceeds to S214. When it is determined that the multiple-device printing process setting is not set (S210: NO), the control application 30 skips S212 and proceeds to S214.

In S214, the control application 30 transmits the printing job to the communicating device with use of the WF wireless communication. When the multiple-device printing process setting is set, the control application 30 transmits one of the divided printing jobs to the communicating device, while the control application transmits the non-divided printing job to the communicating device when the multiple-device printing process setting is not set. Thereafter, the control application 30 sets the processing status flag to "DURING EXECUTION" (S216).

Next, the control application 30 determines whether the failure notification is received from the communicating device (S218). When it is determined that the failure notification is not received (S218: NO), the control application 30 deletes the printing job after receiving the completion notification from the communicating device (S222). Then, the present process is terminated.

When the control application 30 receives the failure notification (S218: YES), the control application 30 sets the processing status flag to "EXECUTION FAILED" (S226). Then, the control application 30 determines whether there remains only one device corresponding to the selected model other than the communicating device (S228). When the number of devices corresponding to the selected model except for the communicating device is zero (e.g., when there remains no device) (S228: NO), the present process is terminated. In that case, the control application 30 avoids transmission of the printing job. On the other hand, when there exists only one device corresponding to the selected model other than the communicating device (S228: YES), the control application 30 returns to S214. It is noted that, when there exists two or more devices corresponding to the selected model other than the communicating device, the user may select a device from the two or more devices. In that case, the control application 30 returns to S214, and transmit the printing job to the selected device.

In S206, when it is determined that the imaging job is not the printing job (S206: NO), that is, when it is determined that the imaging job is the scanning job, the control application 30 determines whether the original document is set to the communicating device (FIG. 7: S230). When it is determined that the original document is not set to the communicating device (S230: NO), the control application 30 repeats S230. When it is determined that the original document is set to the communicating device (S230: YES), the control application 30 determines whether the processing status flag is "DURING EXECUTION" (S232).

When it is determined that the processing status flag is not "DURING EXECUTION" (S232: NO), that is, when the processing status flag is set to "BEFORE EXECUTION," the control application 30 transmits the scanning job to the communicating device (S234). Then, the control application sets the processing status flag to "DURING EXECUTION" (S235). Next, the control application 30 receives the scan data from the communicating device (S236), stores the received scan data in the data storage area 32 (S238), and proceeds to S222.

On the other hand, when it is determined that the processing status flag is "DURING EXECUTION" (S232: YES), the control application 30 transmits the scanning job to the communicating device (S240). Then, the control application 30 receives the scan data from the communicating device (S242), and merges the received scan data with scan data received from another device (S244). Next, the control application 30 stores the merged scan data in the storage area 32 (S246), and proceeds to S222. It is noted that the present process is repeatedly executed at every particular interval after the control application 30 stores the imaging job in the data storage area 32.

According to aspects of the present disclosures, a model of the devices is selected (i.e., designated) at the terminal device side, an execution condition to perform an imaging process is set such that the execution condition corresponds to the selected model of the device. Then, when the selected model of the device and a model of a communicating device which performs short-range wireless communicates with a terminal device (e.g., the mobile phone 10) located close to the communicating device (e.g., the selected model information and the communication model information) are coincide with each other, an execution instruction of the imaging process in accordance with the set execution condition is transmitted to the communicating device. That is, the execution instruction to the imaging process in accordance with the execution condition, which is executable by the device of which the model is the same as the model of the communicating device, is transmitted to the communicating device. Accordingly, the imaging process can be performed suitably by the communicating device.

It is noted that the CPU executing S102 is an example of a terminal device searching for a model of an image processing device, the CPU 12 executing S106 and S112 is an example of a terminal device displaying a model of the found image processing device, the CPU 12 executing S110 is an example of a terminal device comparing capabilities of respective found image processing devices, the CPU 12 executing S116 is an example of a terminal device receiving a designating operation, the CPU 12 executing S118 is an example of a terminal device receiving a setting operation, the CPU 12 executing S122 is an example of a terminal device generating a printing job, the CPU 12 executing S124 is an example of a terminal device storing the printing job, the CPU 12 executing S126 is an example of a terminal device obtaining status of an image processing device, the CPU 12 executing S130 is an example of a terminal device notifying the image processing device whose status has been obtained, the CPU 12 executing S200 is an example of a terminal device communicating with an image processing device through a short-range wireless communication interface, the CPU 12 executing S202 is an example of a terminal device determining whether a model of an image processing device coincides with the designated model, the CPU 12 executing S212 is an example of a terminal device dividing a printing job into a plurality of printing jobs, the CPU 12 executing S214 is an example of a terminal device transmitting of retransmitting an execution instruction to an image processing device, the CPU 12 executing S230 is an example of a terminal device determining whether an original document is set to an image processing device, the CPU 12 executing S234 and S240 is an example of a terminal device transmitting an execution instruction to an image processing device, the CPU 12 executing S228 is an example of a terminal device determining whether there exists an image processing device of which a model is a same as a model of an image processing device to which a printing job is transmitted, and the CPU 12 executing S244 is an example of a terminal device merging scan data received from an image processing device and scan data received from another image processing device.

It is noted that an embodiment of the present invention is not limited to the above-described embodiment, and various modification or improvement may be made to the embodiment based on knowledge of a person skilled in the art. For example, in the above-described embodiment, the communication model information is transmitted from the communicating device to the mobile phone 10 through the NFC wireless communication. Such a configuration may be modified and the communication model information may be transmitted through the WF wireless communication. Further, in the above-described embodiment, the scanning job is transmitted from the mobile phone 10 to the communicating device through the WF wireless communication. Such a configuration may be modified and the scanning job may be transmitted through the NFC wireless communication.

In the above-described embodiment, the processing status flag corresponds to the scanning job is set to "BEFORE EXECUTION" or "DURING EXECUTION." Such a configuration may be modified and the processing status flag corresponds to the scanning job may be set to "BEFORE EXECUTION," "DURING EXECUTION" or "EXECUTION FAILED." Further, similar to the printing job, when the scanning job fails, the scanning job may be transmitted to another device.

According to the above-described embodiment, the printing process and the scanning process are employed as the imaging process. Such a configuration may be modified, and a facsimile processing or the like may also be employed as the imaging process.

According to the above-described embodiment, the mobile phone 10 is employed as a terminal device. A smartphone, a tablet or the like may be employed as the terminal device.

According to the above-described embodiment, the process shown in FIGS. 3-7 is executed by the CPU 12. It is noted that the process may be executed by an ASIC or other logical integrated circuit. Alternatively, the process may be executed by a combination of the CPU 12, the ASIC and/or the other logical integrated circuits.

What is claimed is:

1. A non-transitory computer-readable medium storing computer-readable instructions executable by a processor of a terminal device comprising an operation interface, a short-range wireless communication interface configured to perform short-range wireless communication with an image processing device, a network communication interface configured to communicate with an image processing device connected to a network, and a display, the instructions causing, when executed by the processor, the terminal device to perform:

searching for a model of the image processing device which is communicable through the network communication interface;

displaying, on the display, one or more found models of one or more image processing devices, which are found by the searching through the network communication interface;

receiving a designating operation of designating a model of an image processing device from the displayed one or more found models through the operation interface;

receiving a setting operation of setting an execution condition to perform an imaging process corresponding to the designated model designated by the designating operation;

causing the terminal device to communicate with a first image processing device through the short-range wireless communication interface when the terminal device is moved to inside of a communication range of the short-range wireless communication with the first image processing device after receiving the setting operation;

determining whether a model of the first image processing device, obtained in the short-range wireless communication through the short-range wireless communication interface, coincides with the designated model designated by the designating operation; and transmitting an execution instruction in accordance with the set execution condition corresponding to the designated model to the first image processing device when it is determined that the model of the first image processing device coincides with the designated model.

2. The non-transitory computer-readable medium according to claim 1,
wherein the instructions, when executed by the processor, further cause the terminal device to perform avoiding transmitting the execution instruction when determining that the model of the first image processing device does not coincide with the designated model.

3. The non-transitory computer-readable medium according to claim 1, wherein the instructions, when executed by the processor, further cause the terminal device to perform displaying, when a plurality of image processing devices of a same model are found, the same model as one selectable option on the display.

4. The non-transitory computer-readable medium according to claim 1, wherein the instructions, when executed by the processor, further cause the terminal device to perform:
comparing capabilities of respective found models of the image processing devices; and
displaying, as one selectable option, the found models of the image processing devices of which it is determined that the capabilities are the same.

5. The non-transitory computer-readable medium according to claim 1,
wherein the terminal device comprises a network communication interface configured to communicate with the image processing device connected to a network,
wherein the instructions, when executed by the processor, further cause the terminal device to perform:
obtaining, through the network communication interface, status of the image processing device from the image processing device corresponding to the designated model; and
notifying, before performing the short-range wireless communication with the first image processing device, the image processing device whose status has been obtained when the obtained status of the image processing device indicates that the image processing device is able to perform imaging process.

6. The non-transitory computer-readable medium according to claim 1,
wherein the terminal device comprises a memory,
wherein the imaging process is a printing process,
wherein the instructions, when executed by the processor, further cause the terminal device to perform:
generating a printing job in accordance with the set execution condition;
storing the printing job in the memory; and
transmitting the printing job to the first image processing device as the execution instruction when it is determined that the model of the first image processing device coincides with the designated model.

7. The non-transitory computer-readable medium according to claim 6, wherein the instructions, when executed by the processor, further cause the terminal device to perform:
storing the printing job in the memory until receiving, from the first image processing device to which the printing job is transmitted, a completion notification indicating that the transmitted printing job is completed; and
on condition of receiving, from the first image processing device to which the printing job is transmitted, a failure notification indicating that the transmitted printing job fails before receiving the completion notification:
communicating with a second image processing device different from the first image processing device through the short-range wireless communication interface;
determining whether a model of the second image processing device coincides with the designated model;
transmitting the printing job to the second image processing device when it is determined that the model of the second image processing device coincides with the designated model; and
avoiding transmitting the printing job when it is determined that the model of the second image processing device does not coincide with the designated model.

8. The non-transitory computer-readable medium according to claim 6, wherein the instructions, when executed by the processor, further cause the terminal device to perform:
storing the printing job in the memory until receiving, from the first image processing device to which the printing job is transmitted, a completion notification indicating that the transmitted printing job is completed;
determining whether there exists a third image processing device of which a model is the same as the model of the first image processing device when receiving, from the first image processing device to which the printing job is transmitted, a failure notification indicating that the transmitted printing job fails before receiving the completion notification; and
retransmitting the printing job to the third image processing device when it is determined that there exists the third image processing device.

9. The non-transitory computer-readable medium according to claim 6, wherein the instructions, when executed by the processor, further cause the terminal device to perform:
dividing the printing job into a plurality of printing jobs;
transmitting the terminal device transmits one of the plurality of printing jobs to the first image processing device; and
transmitting remaining ones of the plurality of printing jobs to another image processing device different from the first image processing device.

10. The non-transitory computer-readable medium according to claim 1,
wherein the imaging process is a scanning process,
wherein the instructions, when executed by the processor, further cause the terminal device to perform:
determining whether an original document is set to the first image processing device when it is determined that the model of the first image processing device coincides with the designated model; and
transmitting the terminal device transmits the execution instruction to the first image processing device when it is determined that the original document is set to the first image processing device.

11. The non-transitory computer-readable medium according to claim 10, wherein, the instructions, when executed by the processor, further cause the terminal device to perform;
transmitting, to another image processing device different from the first image processing device, the same execution instruction as the execution instruction transmitted to the first image processing device on condition that the first image processing device executes a scanning process in accordance with the execution instruction and a communication is established with the other image processing device through the short-range wireless communication interface after transmitting the execution instruction to the first image processing device; and merging scan data received from the first image processing device and scan data received from the other image processing device.

12. A terminal device comprising:

an operation interface;

a short-range wireless communication interface configured to perform short-range wireless communication with an image processing device;

a network communication interface configured to communicate with an image processing device connected to a network;

a display; and a processor, wherein the processor is configured to perform:

searching for a model of the image processing device which is communicable through the network communication interface;

displaying, on the display, one or more found models of one or more image processing devices, which are found by the searching through the network communication interface;

receiving a designating operation of designating a model of the image processing device from the displayed one or more found models through the operation interface;

receiving a setting operation of setting an execution condition to perform an imaging process corresponding to the designated model designated by the designating operation;

causing the terminal device to communicate with a first image processing device through the short-range wireless communication interface when the terminal device is moved to inside of a communication range of the short-range wireless communication with the first image processing device after receiving the setting operation;

determining whether a model of the first image processing device, obtained in the short-range wireless communication through the short-range wireless communication interface, coincides with the designated model designated by the designating operation;

transmitting an execution instruction in accordance with the set execution condition corresponding to the designated model to the first image processing device when it is determined that the model of the first image processing device coincides with the designated model; and avoiding transmitting the execution instruction when it is determined that the model of the first image processing device does not coincide with the designated model.

13. A method of controlling a terminal device comprising a processor, an operation interface, a short-range wireless communication interface configured to perform short-range wireless communication with an image processing device, a network communication interface configured to communicate with an image processing device connected to a network, and a display, the method comprising:

searching for a model of the image processing device which is communicable through the network communication interface;

displaying, on the display, one or more found models of one or more image processing devices, which are found by the searching through the network communication interface;

receiving a designating operation of designating a model of the image processing device from the displayed one or more found models through the operation interface;

receiving a setting operation of setting an execution condition to perform an imaging process corresponding to the designated model designated by the designating operation;

causing the terminal device to communicate with a first image processing device through the short-range wireless communication interface when the terminal device is moved to inside of a communication range of the short-range wireless communication with the first image processing device after receiving the setting operation;

determining whether a model of the first image processing device, obtained in the short-range wireless communication through the short-range wireless communication interface, coincides with the designated model designated by the designating operation; and transmitting an execution instruction in accordance with the set execution condition corresponding to the designated model to the first image processing device when it is determined that the model of the first image processing device coincides with the designated model.

* * * * *